May 21, 1940.
O. J. BRATZ
2,201,426
GREASE INJECTING APPARATUS
Filed Feb. 15, 1937
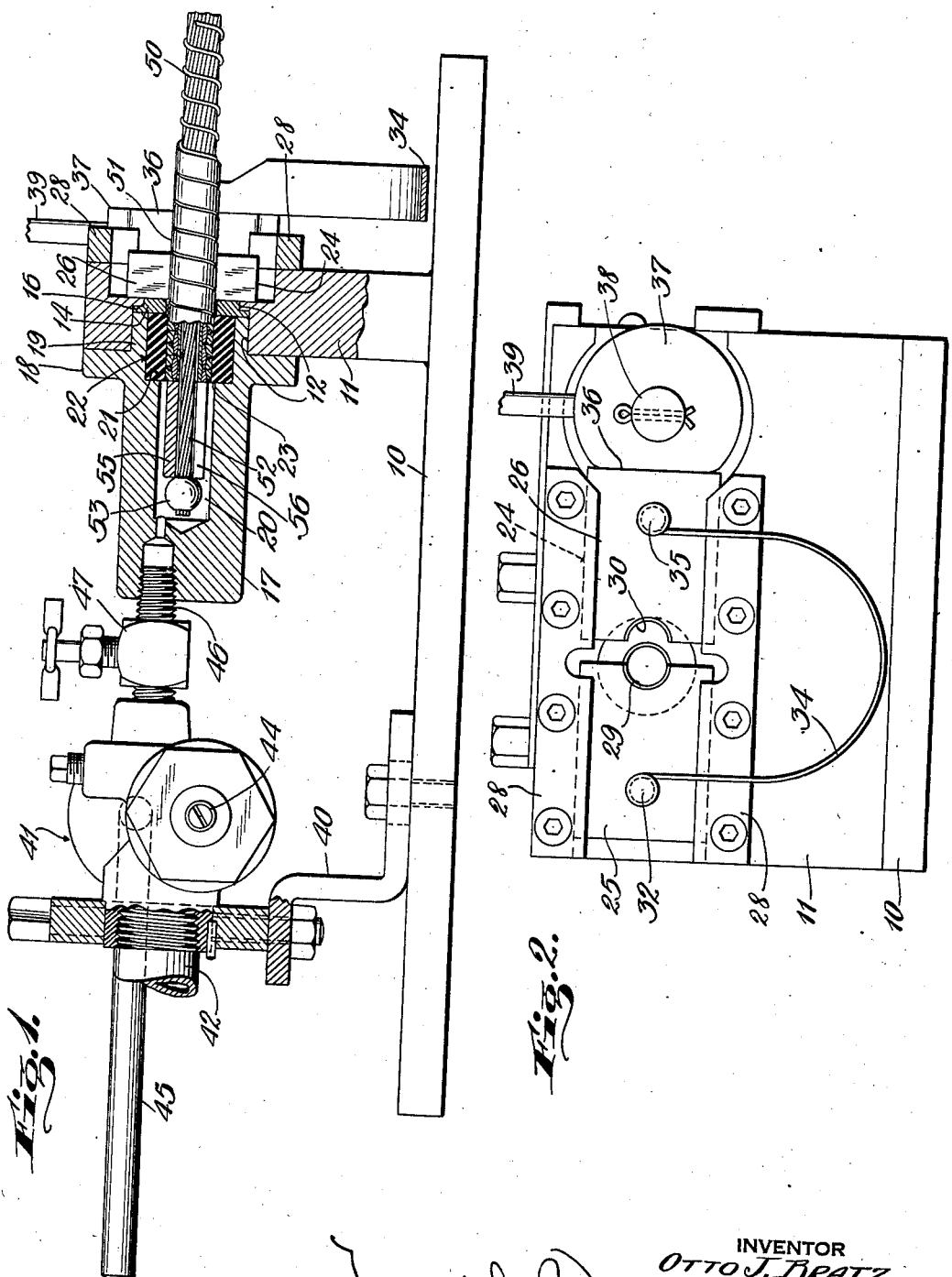
INVENTOR
*OTTO J. BRATZ.*
BY
ATTORNEY Patented May 21, 1940

2,201,426

UNITED STATES PATENT OFFICE 2,201,426

GREASE INJECTING APPARATUS

Otto J. Bratz, Adrian, Mich., assignor to American Chain & Cable Company, Inc., New York, N. Y., a corporation of New York Application February 15, 1937, Serial No. 125,714

6 Claims. (Cl. 285—163)

The present invention relates to apparatus for injecting grease into conduits or tubular guides for relatively movable elongated members. The device is particularly adapted for the greasing of flexible shafts and Bowden wire structures so as to reduce friction between the casing and the member relatively movable therein and also to prevent rusting. Usually there is very little clearance between the inner member and the casing and it is not easy to force grease therebetween, particularly since the grease must be thick so that it will stay where put.

An object of the present invention is to provide a simple grease injecting apparatus by which the introduction of grease into tubular casings may be very conveniently carried out.

A more specific object is to provide means for forcing a measured quantity of grease into a casing containing a cable or other flexible tension element and means for keeping the tension element from blocking the casing while the grease is being introduced.

Other objects and advantages of the invention will appear in the following description of a preferred embodiment, and thereafter the novelty and scope of the invention will be pointed out in the claims.

In the accompanying drawing;

Figure 1 shows the improved grease injecting apparatus partly in side elevation and partly in section; and Fig. 2 is an end elevation showing the apparatus as viewed from the right hand end of Fig. 1.

The apparatus comprises a base 10 which supports a bracket 11. This bracket is of plate-like form disposed edgewise to the base and extending across the base near one end thereof. This bracket has a stepped aperture 12 therethrough with the step of smaller diameter disposed on the outer or right hand side of the bracket, as viewed in Fig. 1. A bushing 14 is fitted into the aperture 12 and has an annular flange which seats against a shoulder 16 formed between the two steps of the aperture.

A cylinder 17 is secured to the bracket 11, being formed with a flange 18 which bears against the inner or left hand face of the bracket, as viewed in Fig. 1. This cylinder is also formed with a tubular extension 19 that fits snugly into the aperture 12. The outer end of this sleeve bears against the bushing 14 and serves to hold the bushing in place. The cylinder is formed with a grease chamber 20 and has a rubber gasket or sleeve 21, of smaller internal diameter than the chamber 20, fitted into a suitable recess 22 formed in the tubular extension 19. Thus the inner end (the left hand end, as viewed in Fig. 1) of the sleeve 21 presents a shoulder 23 projecting into the grease chamber 20, while the opposite end of the sleeve bears against the bushing 14.

In the outer face of the bracket 11, that is the right hand side, as viewed in Fig. 1, there is a recessed slideway 24 which extends transversely across the aperture. A pair of slide blocks 25 and 26, respectively, are fitted to slide in this slideway being retained therein by overlapping rails 28 fixed to the bracket. The blocks 25 and 26 are provided in their adjacent ends with semi-circular recesses 29 and 30, respectively, of slightly smaller diameter than the opening in the bushing 14.

The slide block 25 is normally held in fixed position by a screw 32 which passes therethrough and into the bracket 11, and the block is so positioned that its semi-circular recess 29 will be coaxial with the opening in the bushing 14 and hence with the grease chamber 20 and the bore of rubber gasket 21. The other slide block 26 is normally held in retracted position, as shown in Fig. 2, by means of a bowed leaf spring 34 which is anchored at one end to the screw 32, while the other end of the bow is connected to a screw 35 projecting from the block 26. The spring 34 tends to spread the slide blocks apart and normally presses the block 26 against a flat 36 on a cam 37 which is rotatable on a stud 38 projecting from the bracket. A handle 39 fixed to the cam may be operated to turn the cam 37 on the stud 38, thereby forcing the slide block 26 toward the slide block 25.

Near the opposite end of the base 10 from the bracket 11 is another bracket 40 which supports a device 41 for delivering measured quantities of grease under pressure. This device is well known in the art and needs no detailed explanation. Grease under high pressure is supplied to the device through an inlet pipe 42 and the quantity of grease supplied is determined by a receiving chamber, the capacity of which is controlled by an adjustable gauge 44. A handle 45 when in the position illustrated in Fig. 1 admits grease from the pipe 42 to the measuring chamber and when the handle 45 is turned through a predetermined angle this measured quantity of greases passes through an outlet pipe 46 to the grease chamber 20 of the cylinder 17. In the outlet pipe 46 there is a valve 47 which is operable to control the rate of flow of grease into the chamber 20 and also to provide means for cutting off this flow when the desired amount of grease has been supplied. Ordinarily, however, this valve 47 is wide open and the amount of grease supplied is determined by the setting of the device 44.

A device to be greased is shown in the drawing as consisting of a flexible casing 50 built up of layers of reversely coiled wire, with a ferrule 51 provided at each end of the casing. In the drawing, only one end of the casing and its ferrule are shown. A cable 52 is fitted to slide in the casing and protrudes from each end thereof, being provided at each end with a bead 53 or other fitting which is too large to pass through the bore of the casing.

In the operation of the apparatus it is necessary to keep the bead 53 from blocking the mouth of the casing 50, and to this end a spacer 55 is provided which fits between the bead 53 and the adjacent end of the casing 50. This spacer is of cylindrical form and of a diameter no greater than that of the ferrule. The spacer has a slot 56 cut through one side thereof and extending throughout the length of the cylinder, and the slot is at least as wide as the diameter of the cable 52 so that the spacer may be applied laterally upon the cable. With the spacer in place, the casing is now inserted through the rubber sleeve 21 into the grease chamber 20, and the handle 39 is then operated to force the slide block 26 to clamping position, thereby gripping the ferrule 51 tightly. The handle 45 is now operated to introduce grease into the grease chamber 20. Because of the slot 56 in the spacer 55 this grease may readily flow into the casing 50. It will be recalled that the bushing 21 is of smaller internal diameter than that of the grease chamber 20 and consequently presents a shoulder 23 against which the grease under pressure in chamber 20 bears. The pressure employed may run as high as 2,000 pounds per square inch or even more and under this pressure the rubber sleeve is longitudinally compressed, thereby contracting its inner diameter and causing it to effect a tight seal to prevent escape of grease along the outer surface of the ferrule 51. When the proper amount of grease has been introduced into the casing it will begin to show at the opposite end of the casing. At such time the valve 47 may be closed to arrest further feed of grease into the chamber 20. However, it is intended that the device 41 shall be adjusted to supply just the requisite amount of grease under pressure to fill the casing 50 to the desired extent, so that the use of the valve 47 will ordinarily not be required. After the casing has been filled the operator will turn the handle 45 to fill the measuring chamber 41 for the next operation and will then operate handle 39 to unclamp the slide blocks 25 and 26, so as to permit of withdrawing the tubular casing 50.

While the slide block 25 is fixed it is preferable to have this slide block as well as the slide block 26 removable so that the apparatus may be adjusted to take care of casings of a different diameter. In such case the bushing 14 and rubber sleeve 21 would also be replaced with corresponding parts of the correct internal diameter for the work to be handled.

While I have described a preferred embodiment of my invention it will be understood that this is to be taken as illustrative and not limitative and that I reserve the right to make various changes in form, construction and arrangement of parts without departing from the spirit and scope of my invention as set forth in the claims.

I claim:

1. An apparatus for injecting grease into a tubular member and about an elongated element embraced thereby, said element projecting at opposite ends thereof from said member and provided with end fittings too large to pass through the bore of the tubular member, said apparatus comprising a body formed with a grease chamber having a mouth through which an end of the tubular member and element may be introduced, means for effecting a seal at said mouth about said end of the tubular member, means for introducing grease under pressure into the chamber and thence into the tubular member, and means for holding the fitting at the inserted end of said element clear of said end of the tubular member to prevent the fitting from blocking the bore of said member.

2. An apparatus for injecting grease into a tubular member and about an elongated element embraced thereby, said element projecting at opposite ends thereof from said member and provided with end fittings too large to pass through the bore of the tubular member, said apparatus comprising a body formed with a grease chamber having a mouth through which an end of the tubular member and element may be introduced, means for effecting a seal at said mouth about said end of the tubular member, means for introducing grease under pressure into the chamber and thence into the tubular member, means for holding the fitting at the inserted end of said element clear of said end of the tubular member to prevent the fitting from blocking the bore of said member, and means for controlling the rate of flow of the grease into said member.

3. An apparatus for injecting grease into a tubular member and about an elongated element embraced thereby, said element projecting at opposite ends thereof from said member and provided with end fittings too large to pass through the bore of the tubular member, said apparatus comprising a body formed with a grease chamber having a mouth through which an end of the tubular member and element may be introduced, means for effecting a seal at said mouth about said end of the tubular member, means for measuring a quantity of grease and introducing the same under pressure into the chamber and thence into the tubular member, and means for holding the fitting at the inserted end of said element clear of said end of the tubular member to prevent the fitting from blocking the bore of said member.

4. An apparatus for injecting grease into a tubular casing and about an elongated element embraced thereby, said element projecting from an end of the casing and provided on such projecting end with an enlargement of greater diameter than the bore of the casing, said apparatus comprising a body fromed with a grease chamber having a mouth through which said end of the casing and element may be introduced, means for effecting a seal at said mouth about said end of the casing, means for introducing grease under pressure into the chamber and thence into the casing, and a spacer adapted to be fitted between said enlargement and said casing, said spacer being formed with a passage to admit the grease from the chamber into the casing.

5. An apparatus for injecting grease into a tubular casing and about an elongated element embraced thereby, said element projecting from an end of the casing and provided on such projecting end with an enlargement of greater diameter than the bore of the casing, said apparatus comprising a body formed with a grease chamber having a mouth through which said end of the casing and element may be introduced, means for effecting a seal at said mouth about said end of the casing, means for introducing grease under pressure into the chamber and thence into the casing, and a spacer of C-shape in cross-section adapted to be fitted upon said projecting end of the element between the casing and the enlargement to keep the latter from blocking the bore of the casing.

6. An apparatus for injecting grease into a tubular casing and about an elongated element embraced thereby, said element projecting from an end of the casing and provided on such projecting end with an enlargement of greater diameter than the bore of the casing, said apparatus comprising a body formed with a grease chamber having a mouth through which said end of the casing and element may be introduced, means for effecting a seal at said mouth about said end of the casing, means for introducing grease under pressure into the chamber and thence into the casing, and means for spacing said enlargement from said casing to admit grease from the chamber into the casing.

OTTO J. BRATZ.